US009956525B2

(12) United States Patent
Kim et al.

(10) Patent No.: US 9,956,525 B2
(45) Date of Patent: May 1, 2018

(54) APPARATUS FOR PURIFYING WASTE GASES FOR INTEGRATED SEMICONDUCTOR

(71) Applicant: Global Standard Technology Co., Ltd., Gyeonggi-do (KR)

(72) Inventors: Duk Jun Kim, Gyeonggi-do (KR); Sang Joon Park, Gyeonggi-do (KR); Dong Keun Jeon, Seoul (KR); Ki Yong Lee, Seoul (KR); Hyun Uk Sin, Gyeonggi-do (KR); Gyu Dong Moon, Gyeongsangbuk-do (KR)

(73) Assignee: Global Standard Technology Co., Ltd., Gyeonggi-do (KR)

( * ) Notice: Subject to any disclaimer, the term of this patent is extended or adjusted under 35 U.S.C. 154(b) by 180 days.

(21) Appl. No.: 14/993,170

(22) Filed: Jan. 12, 2016

(65) Prior Publication Data

US 2017/0065934 A1  Mar. 9, 2017

(30) Foreign Application Priority Data

Sep. 4, 2015 (KR) .......................... 10-2015-0125530

(51) Int. Cl.
*F01N 3/20* (2006.01)
*B01D 53/76* (2006.01)
(Continued)

(52) U.S. Cl.
CPC ........... *B01D 53/76* (2013.01); *B01D 47/022* (2013.01); *B01D 53/14* (2013.01); *B01D 53/44* (2013.01);
(Continued)

(58) Field of Classification Search
CPC ........ B01D 53/44; B01D 53/75; B01D 53/78; B01D 47/022; B01D 53/76
(Continued)

(56) References Cited

U.S. PATENT DOCUMENTS

| 7,160,521 B2 * | 1/2007 | Porshnev ............... B01D 53/68 422/186.04 |
| 2010/0061908 A1 * | 3/2010 | Smith ................. C23C 16/4412 423/240 R |

FOREIGN PATENT DOCUMENTS

| JP | 02-68414 | 3/1990 |
| JP | 2001-082723 | 3/2001 |

(Continued)

OTHER PUBLICATIONS

Japanese Office Action dated Jul. 12, 2016, JP Application No. 2015-252749.

(Continued)

*Primary Examiner* — Tom P Duong
(74) *Attorney, Agent, or Firm* — The Dobrusin Law Firm, PC

(57) ABSTRACT

An apparatus for purifying waste gases for an integrated semiconductor is provided, which includes a cover including a burner mounted thereon to generate a flame and a plurality of waste gas inlet pipes formed on a circumference of the burner to make waste gases flow therethrough; a reactor including upper and lower openings formed thereon so that the cover is detachably coupled to the upper opening, a converging member tapered to have a smaller diameter as going toward a lower portion thereof, and a transport pipe vertically arranged to communicate with an apex of the converging member, in which a water curtain is formed to prevent accumulation of by-products, to burn and discharge the inflow waste gases; and a cleaning portion integrally formed in the reactor to water-clean the burnt waste gases that are discharged into the reactor after passing through the transport pipe to collect particles. Since the burner, the reactor, and the scrubber are integrally formed in a body.

2 Claims, 5 Drawing Sheets

(51) Int. Cl.
    *B01D 47/02*      (2006.01)
    *B01D 53/75*      (2006.01)
    *B01D 53/78*      (2006.01)
    *B01D 53/44*      (2006.01)
    *B01D 53/68*      (2006.01)
    *B01D 53/14*      (2006.01)

(52) U.S. Cl.
    CPC ............. *B01D 53/68* (2013.01); *B01D 53/75* (2013.01); *B01D 53/78* (2013.01); *B01D 2252/103* (2013.01); *B01D 2257/2066* (2013.01); *B01D 2258/0216* (2013.01)

(58) Field of Classification Search
    USPC ........................................................ 422/168
    See application file for complete search history.

(56) References Cited

FOREIGN PATENT DOCUMENTS

| | | |
|---|---|---|
| JP | 2008-514388 | 5/2008 |
| JP | 2011-025140 | 2/2011 |
| KR | 10-2000-0065525 | 11/2000 |
| KR | 10-2007-0006183 | 1/2007 |

OTHER PUBLICATIONS

Korean Office Action dated Aug. 16, 2016, KR Application No. 10-2015-0125530.

\* cited by examiner

APPARATUS FOR PURIFYING WASTE GASES FOR INTEGRATED SEMICONDUCTOR

TECHNICAL FIELD

The present invention relates to an apparatus for purifying waste gases for a semiconductor, and more particularly, to an apparatus for purifying waste gases, which can purify waste gases that are generated in the process of manufacturing a wet semiconductor, a flat panel display (FPD), or a liquid crystal display (LCD) by burning non-biodegradable materials included in the waste gases and removing the non-biodegradable materials through water-based cleaning through a wet scrubber.

BACKGROUND OF THE INVENTION

In general, a semiconductor process includes various kinds of processes, such as photography, diffusion, etching, chemical vapor deposition, and metal deposition, which are repeatedly performed on a silicon substrate. Among such processes, the diffusion, etching, and chemical vapor deposition are performed so that processing gases are supplied into an airtight process chamber to react on a wafer.

On the other hand, gases that are used in a semiconductor manufacturing process may have strong characteristics, such as noxiousness, combustibility, and corrosion. In the processes of manufacturing facilities, only about 10% of the processing gases takes part in the reaction, and the remaining 90% thereof that is in a non-reacted state is discharged from the manufacturing facilities.

If such noxious waste gases that are fixed gases are discharged in the atmosphere as they are without any separate purifying process, they may cause damage of peripheral manufacturing facilities, severe environmental pollution, and operator's safety accidents. Accordingly, in each of the manufacturing facilities, a scrubber is installed on a gas discharge line that is connected to an exhaust duct to decompose and purify the discharge gases into a safe state.

The scrubber is configured to use properties of the waste gases, such as explosive reaction on a general air when coming in contact with the general air, combustibility, reaction on a gas processor, and solubility in water. The scrubber may be briefly classified into a dry type, a wet type, and a mixed type that adopts both the dry type and the wet type.

The wet type scrubber is configured to collect waste gases using water, clean and cool the collected waste gases. The wet type scrubber has the advantages of a relatively simple configuration, easy manufacturing, and large capacity. However, the wet type scrubber has the drawbacks that it is unable to process water insoluble gases and in particular, it is improper to process waste gases including a hydrogen group having strong flammability.

The dry type scrubber is configured to make waste gases pass through the inside of a burner to achieve direct combustion of the waste gases or to make the waste gases pass through the inside of a high-temperature chamber that is formed using a heat source to achieve indirect combustion of the waste gases. The dry type scrubber has a prominent effect in processing flammable (combustible) gases, but is improper to process inflammable gases such as water-soluble gases.

The mixed type scrubber is configured to primarily burn waste gases in a combustion chamber to remove flammable gases and explosive gases and then to secondarily dissolve the waste gases in a water tank to dissolve the water-soluble noxious waste gases in water. The mixed type scrubber in the related art has already been disclosed in Korean Patent Application Publication No. 10-2010-0021135 entitled "Apparatus for processing waste gases".

On the other hand, as illustrated in FIG. 5, an apparatus for purifying waste gases in the related art is configured to include a reactor 2' into which waste gases flow through waste gas inlet ports that are downwardly installed on an upper side; a burner portion 3' installed on an upper portion of the reactor 2' to burn the waste gases through generation of a flame in the reactor; a water storage tank 5' installed on a discharge pipe 4' that is connected to a lower portion of the reactor 2' to store water therein; and a wet cleaning portion 6' connected to one side surface of the discharge pipe 4' to make burnt gaseous particles pass therethrough so that the large particles are collected by water that is supplied to the inside of the wet cleaning portion 6' to be recovered to the water storage tank 5', and the gases are discharged to an upper portion of the wet cleaning portion 6'.

In processing the waste gases through the gas scrubber, the waste gases that are generated from a processing chamber of a semiconductor facility moves to a burner of the reactor through an injection portion, and then are burnt through combustion/oxidation or thermal decomposition. Non-processed gases or dust particles, which are not processed through the burning, move to the wet scrubber, and at this time, the wet cleaning portion performs a wetting process in which powder in the oxidized gases is separated and dropped into a water bath through spraying of the water, and discharges the cleaned gases to the air through a filter and a duct.

However, in the related art, since the burner, the reactor, and the set cleaning portion are separated from one another, the volume of the apparatus is increased to heighten space occupancy, and this may cause uneasiness of periodic maintenance of the apparatus and an increase of energy consumption for processing the semiconductor gases.

SUMMARY OF THE INVENTION

Accordingly, the present invention has been made to solve the aforementioned problems occurring in the related art, and one subject to be achieved by the present invention is to provide an apparatus for purifying waste gases for a semiconductor, which can integrate a burner, a reactor, and a scrubber in a body to minimize a volume of the apparatus and to increase easiness of periodic maintenance of the apparatus and performance of processed gases.

In accordance with one aspect of the present invention, there is provided an apparatus for purifying waste gases for a semiconductor, which includes a cover including a burner mounted thereon to generate a flame and a plurality of waste gas inlet pipes formed on a circumference of the burner to make waste gases flow therethrough; a reactor including upper and lower openings formed thereon so that the cover is detachably coupled to the upper opening, a converging member tapered to have a smaller diameter as going toward a lower portion thereof, and a transport pipe vertically arranged to communicate with an apex of the converging member, in which a water curtain is formed to prevent accumulation of by-products, to burn and discharge the inflow waste gases; and a cleaning portion integrally formed in the reactor to water-clean the burnt waste gases that are discharged into the reactor after passing through the transport pipe to collect particles.

The cleaning portion may include a partition member formed on an outer circumference of the transport pipe to spirally partition a space of the reactor; a punched partition plate coupled to a periphery of a lower discharge port of the transport pipe and installed on a lower portion of an inside of the reactor; a plurality of ports formed on the outer circumference of the reactor and connected to a cleaning water supply pipe for injecting cleaning water; and a discharge port formed on one side of the outer circumference of the reactor to discharge the waste gases therein.

According to the present invention, since the burner, the reactor, and the scrubber are integrally formed in a body, the volume of the apparatus can be minimized, and the easiness of the periodic maintenance of the apparatus and energy saving can be increased.

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE INVENTION

Figure 1:
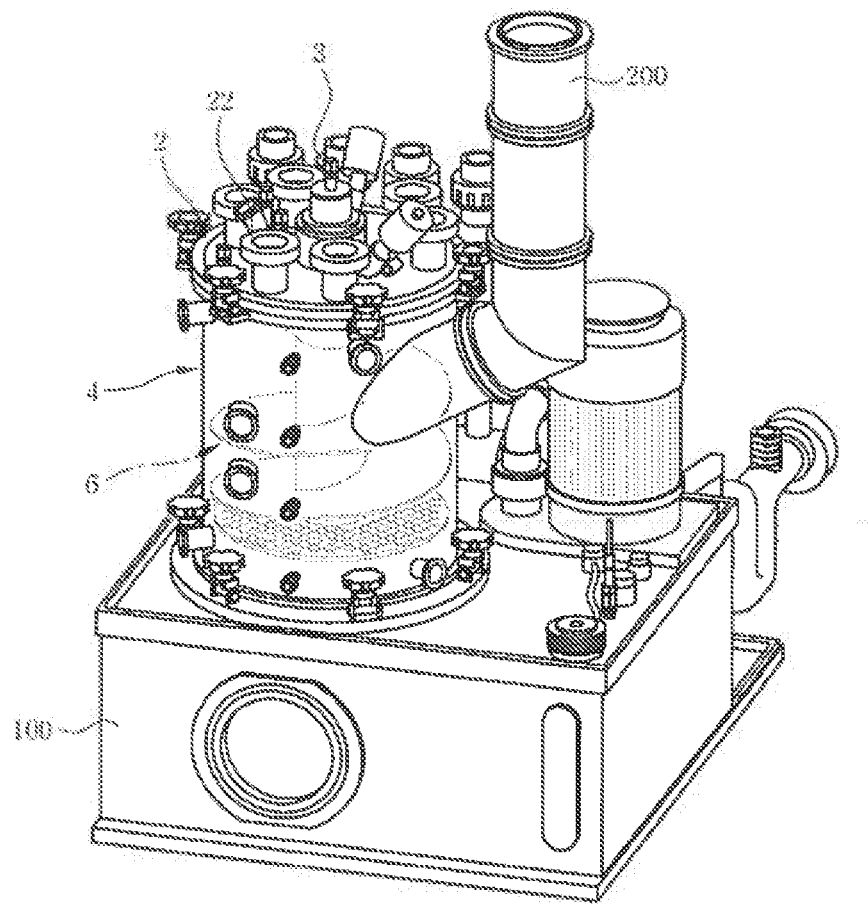
FIG. 1 is a perspective view illustrating an apparatus for purifying waste gases for an integrated semiconductor according to an embodiment of the present invention.

Hereinafter, preferred embodiments of the present invention will be described in detail with reference to the accompanying drawings.

The embodiments to be described hereinafter are nothing but specific details provided to assist those of ordinary skill in the art in a comprehensive understanding of the invention, and thus do not mean that the technical idea and scope of the present invention are limited thereto.

Further, the sizes or shapes of constituent elements illustrated in the drawings may be exaggerated for clarity and convenience in explanation. Further, all terms that are specially defined in consideration of the configuration and operation of the present invention may differ depending on intentions of a user or an operator or customs, and thus they should be defined on the basis of the contents of the whole description of the present invention.

Figure 2:
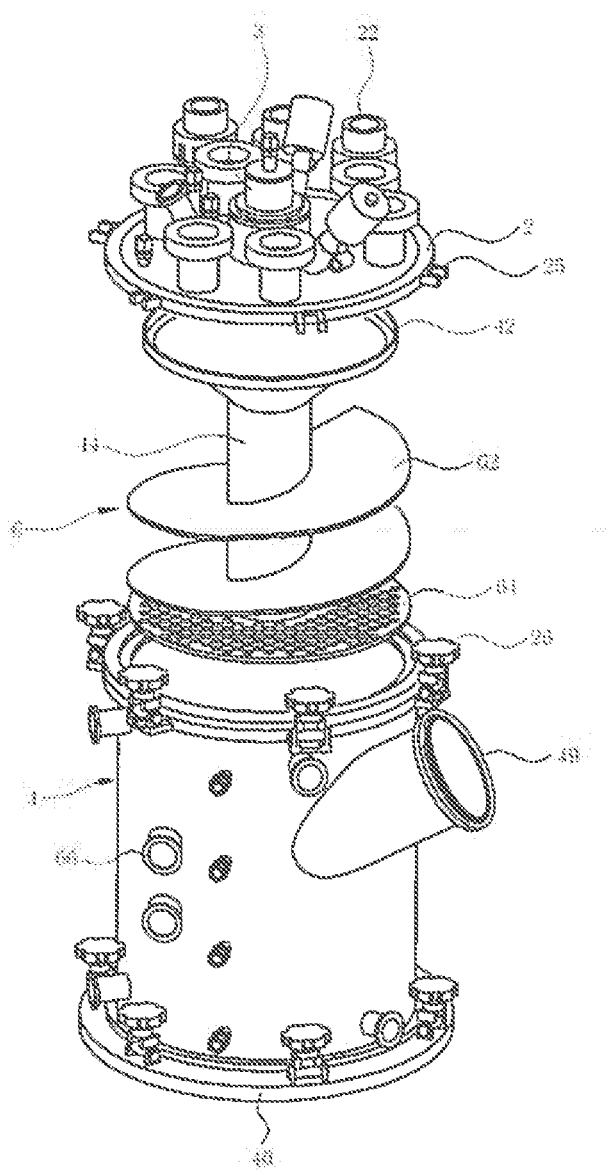
FIG. 2 is an exploded perspective view illustrating an apparatus for purifying waste gases for an integrated semiconductor according to an embodiment of the present invention.
Figure 3:
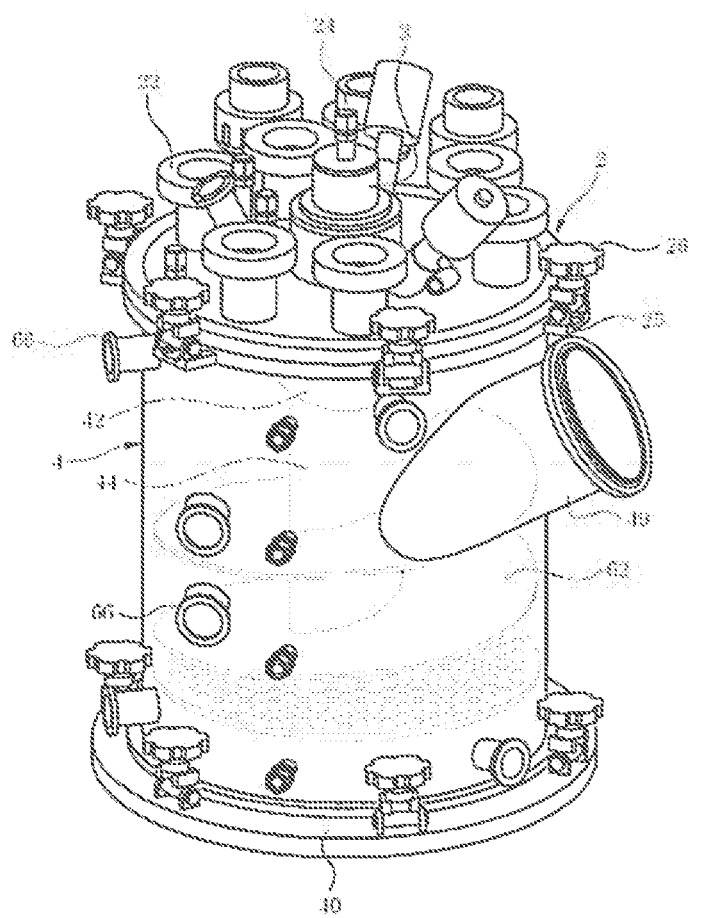
FIG. 3 is a perspective view explaining an operation of an apparatus for purifying waste gases for an integrated semiconductor according to an embodiment of the present invention.
Figure 4:
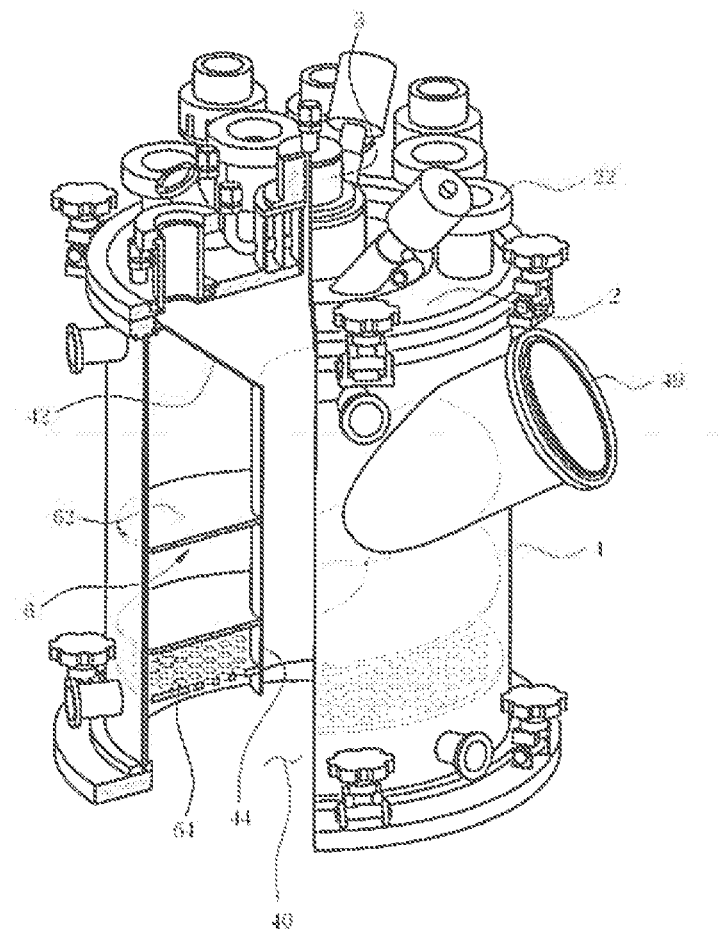
FIG. 4 is a cross-sectional perspective view of an apparatus for purifying waste gases for an integrated semiconductor according to an embodiment of the present invention.
Figure 5:
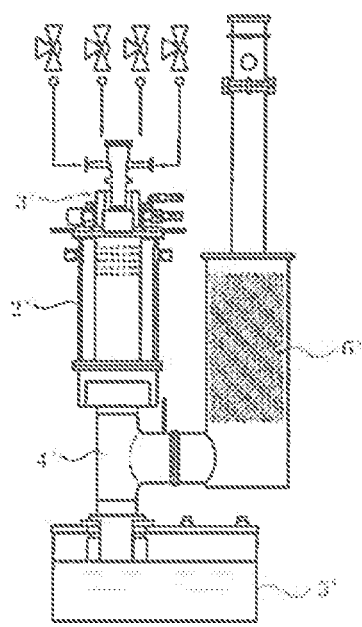
FIG. 5 is a view illustrating an apparatus for purifying waste gases in the related art.

FIG. 1 is a perspective view illustrating an apparatus for purifying waste gases for an integrated semiconductor according to an embodiment of the present invention, and FIG. 2 is an exploded perspective view illustrating an apparatus for purifying waste gases for an integrated semiconductor according to an embodiment of the present invention. FIG. 3 is a perspective view explaining an operation of an apparatus for purifying waste gases for an integrated semiconductor according to an embodiment of the present invention, and FIG. 4 is a cross-sectional perspective view of an apparatus for purifying waste gases for an integrated semiconductor according to an embodiment of the present invention.

As illustrated in FIGS. 1 to 3, an apparatus for purifying waste gases for an integrated semiconductor according to an embodiment of the present invention includes a cover 2 including a burner 3 mounted in the center of the cover 2 to generate a flame and a plurality of waste gas inlet pipes 22 formed on a circumference of the burner 3 to make waste gases flow therethrough; a reactor 4 including upper and lower openings formed thereon so that the cover 2 is detachably coupled to the upper opening, a converging member 42 tapered to have a smaller diameter as going toward a lower portion thereof, and a transport pipe 44 vertically arranged to communicate with an apex of the converging member 42, in which a water curtain is formed to prevent accumulation of by-products, to burn and discharge the inflow waste gases; and a cleaning portion 6 integrally formed in the reactor 4 to water-clean the burnt waste gases that are discharged into the reactor 4 in the form of an eddy after passing through the transport pipe 44 to collect particles.

The burner 3 is formed in the center of the cover 2, and the plurality of waste gas inlet pipes 22 are radially formed on an outside of the burner 3. An oxygen injection pipe 23 is connected to one side of the burner 3, and a fuel gas injection pipe 24 is connected to the other side of the burner 3.

A nozzle (not illustrated) for discharging a flame of the burner 3 is formed inside the cover 2 to face the center of the converging member 42.

The burner 3 radiates a flame into the reactor 4 to burn the waste gases that are supplied into the converging member through combustion/oxidation or thermal decomposition.

The reactor 4 has the upper and lower openings, and is in the form of a cylinder in which a space is formed.

The cover 2 is detachably coupled to the upper opening. A plurality of brackets 25 are formed on the outer circumference of the cover 2, and a plurality of fasteners 26 are formed on the outer circumference of the reactor 4 to be fastened to the brackets 25.

In the reactor 4, the converging member 42 that is tapered to have a smaller diameter as going toward the lower portion thereof and the transport pipe 44 vertically arranged to communicate with the apex of the converging member 42 are formed to burn and discharge the inflow waste gases.

A lower discharge port 49 of the transport pipe 44 is positioned upper than the lower opening 40 of the reactor 4, and thus the waste gases that are discharged from the discharge port 49 of the transport pipe 44 are again diffused into the reactor 4.

On the other hand, according to an embodiment of the present invention, the wet cleaning portion 6 is integrally formed in the reactor 4.

The cleaning portion 6 is configured to include a partition member 62 formed on an outer circumference of the transport pipe 44 to spirally partition a space of the reactor 4; a punched partition plate 64 coupled to a periphery of the lower discharge port 49 of the transport pipe 44 and installed on a lower portion of an inside of the reactor 4; a plurality of ports 66 formed on the outer circumference of the reactor 4 and connected to a cleaning water supply pipe (not illustrated) for injecting cleaning water; and the discharge port 49 formed on one side of the outer circumference of the reactor 4 to discharge the waste gases therein.

The partition member 62 is in the form of a spiral circular plate. A micro-gap is provided between the outer circumference of the circular plate and the inner circumference of the reactor 4, and thus the waste gases rise in the form of an eddy along the spiral shape of the partition member 62.

Accordingly, the cleaning water that is supplied from the ports 66 comes in contact with the waste gases, and large particles are collected in water and drop downward to be collected, in addition, the waste gases are cooled.

The dropping cleaning water is uniformly dispersed as passing through the punched partition plate 64, and then is collected in a water storage tank 100 that is connected to the lower opening 40.

Hereinafter, the operation of the apparatus for purifying waste gases for an integrated semiconductor according to an embodiment of the present invention will be described.

Waste gases including pollution materials, such as PFCs gases, which are generated in a semiconductor process, are supplied to the reactor 4 through the inlet ports 22.

At the same time, plasma that is generated in the burner 3 burns the waste gases that flow into the converging member 42 to decompose the PFCs gases.

Thereafter, noxious gases, such as HF, and particulate matters are generated as by-products of the combustion gases.

The generated by-products of the combustion gases are transported to the lower portion through the transport pipe 44, and then are dispersed to an outside through the discharge port 49 to be diffused into the reactor 4.

The diffused by-products of the combustion gases rise spirally along the partition member 62.

At the same time, since the by-products come in contact with the cleaning water that is sprayed in the reactor 4, the particles (pollution materials) are collected in water and drop to be discharged to the lower portion.

Accordingly, the combustion gases from which the particles are removed are discharged through a chimney 200, and the particulate matters are collected in the cleaning water to be collected in the water storage tank 100.

Although the present invention has been described with reference to the preferred embodiments in the attached figures, it is noted that equivalents may be employed and substitutions made herein without departing from the scope of the invention as recited in the claims.

What is claimed is:

1. An apparatus for purifying waste gases for a semiconductor, comprising:
    a cover including a burner mounted thereon to generate a flame and a plurality of waste gas inlet pipes formed on a circumference of the burner to make waste gases flow therethrough;
    a reactor including upper and lower openings formed thereon so that the cover is detachably coupled to the upper opening, a converging member tapered to have a smaller diameter as going toward a lower portion thereof, and a transport pipe vertically arranged to communicate with an apex of the converging member, in which a water curtain is formed to prevent accumulation of by-products, to burn and discharge the inflow waste gases; and
    a cleaning portion integrally formed in the reactor to water-clean the burnt waste gases that are discharged into the reactor after passing through the transport pipe to collect particles;
    wherein the cleaning portion comprises:
    a partition member formed on an outer circumference of the transport pipe to spirally partition a space of the reactor;
    a plurality of ports formed on the outer circumference of the reactor and connected to a cleaning water supply pipe for injecting cleaning water; and
    a discharge port formed on one side of the outer circumference of the reactor to discharge the waste gases therein.

2. The apparatus for purifying waste gases according to claim 1, wherein the cleaning portion further comprises a punched partition plate coupled to a periphery of a lower discharge port of the transport pipe and installed on a lower portion of an inside of the reactor.

\* \* \* \* \*